United States Patent
Surnilla et al.

(10) Patent No.: US 8,275,538 B2
(45) Date of Patent: Sep. 25, 2012

(54) MULTI-FUEL ENGINE STARTING CONTROL SYSTEM AND METHOD

(75) Inventors: Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 775 days.

(21) Appl. No.: 12/483,625

(22) Filed: Jun. 12, 2009

(65) Prior Publication Data

US 2010/0318284 A1   Dec. 16, 2010

(51) Int. Cl.
G06F 19/00 (2006.01)
F02D 29/02 (2006.01)
F02D 41/06 (2006.01)
F02P 15/00 (2006.01)

(52) U.S. Cl. ............ 701/113; 123/179.5; 123/179.16; 123/431; 123/491; 123/575; 701/104

(58) Field of Classification Search .............. 123/179.5, 123/179.8, 179.9, 179.16, 179.18, 431, 491, 123/525, 527, 575, 576; 701/101–105, 113
See application file for complete search history.

(56) References Cited

U.S. PATENT DOCUMENTS

| 4,009,695 | A | * | 3/1977 | Ule ............................ 123/179.5 |
| 5,524,582 | A | * | 6/1996 | Suh et al. ................... 123/179.8 |
| 5,566,653 | A | * | 10/1996 | Feuling ....................... 123/179.8 |
| 6,659,071 | B2 | | 12/2003 | LaPointe et al. |
| 6,990,946 | B2 | * | 1/2006 | Goto ............................. 123/275 |
| 7,249,454 | B2 | | 7/2007 | Ichise et al. |
| 7,357,121 | B2 | | 4/2008 | Nakamura |
| 2004/0111210 | A1 | | 6/2004 | Davis et al. |
| 2008/0115759 | A1 | | 5/2008 | Russell |
| 2010/0318277 | A1 | * | 12/2010 | Pursifull et al. ............. 701/103 |

* cited by examiner

*Primary Examiner* — Willis R Wolfe, Jr.
(74) *Attorney, Agent, or Firm* — Julia Voutyras; Alleman Hall McCoy Russell & Tuttle LLP (57) ABSTRACT

Various example approaches are described, one of which includes a method for controlling injection of gaseous and liquid fuel to a cylinder during engine starting. Specifically, gaseous fuel is injected during or before an intake stroke of the cycle to form a well-mixed overall lean air-fuel mixture, and then liquid fuel is directly injected to the cylinder at least during one of a compression and expansion stroke of the engine cycle to form a rich air-fuel cloud near the spark plug, where a spark initiates combustion of the injected fuels. In one example, the rich cloud enables additional spark retard, and thus faster catalyst light-off, while maintain acceptable combustion stability of the gaseous fuel.

21 Claims, 7 Drawing Sheets

MULTI-FUEL ENGINE STARTING CONTROL SYSTEM AND METHOD

BACKGROUND/SUMMARY

During engine starting, various approaches may be used to obtain well mixed air and fuel in the cylinder in order to provide more complete combustion and thus less emission of various exhaust constituents. For example, some vehicles may be operated with either or both of liquid and gaseous fuel. In these systems, prior approaches teach that, particularly during engine starting, gaseous fuel may be preferentially used to improve mixing, as compared with liquid fuel, especially during cold (e.g., non-warmed) engine starting conditions. See, for example, U.S. Pat. No. 5,566,653.

However, the inventors herein have recognized some issues with this approach. As one example, when using spark retard to promote increased exhaust temperature and thus faster catalyst light-off, the amount of spark retard may be limited by the combustion characteristics of the gaseous fuel. Namely, when the air-fuel ratio of fresh air to the gaseous fuel is set slightly lean of stoichiometry (to reduce NOx formation), the amount of spark retard may be limited, in part because of the well-mixed state of the gaseous fuel which has substantially no rich pockets that would otherwise aid ignition. In other words, there can be a paradoxical situation using gaseous fuel for engine starting, in that the gaseous fuel's improved mixing helps reduce engine out emissions due to more complete combustion, yet it degrades the engine's ability to increase exhaust heat used to more quickly raise the temperature of an emission catalyst used to react with the engine out emissions.

One example approach to at least partially address the above paradox is a method of controlling an engine having a cylinder with a spark plug, the method comprising: during engine starting, injecting gaseous fuel to the cylinder at least during or before an intake stroke of an engine cycle to form a well-mixed overall lean air-fuel mixture, and then directly injecting liquid fuel to the cylinder at least during one of a compression and expansion stroke of the engine cycle to form a rich air-fuel cloud near the spark plug; and spark initiating combustion of the injected fuels. In one example, a majority of the total fuel burned may be gaseous fuel. In this way, it is possible to achieve both low engine out emissions as the majority of burned fuel is gaseous and well mixed (and lean of stoichiometry), but is it also possible to further retard spark timing and achieve reliable combustion via the rich cloud formed by the liquid fuel injection.

Note that the gaseous fuel injection may be provided in various ways, such as directly or via port or central injection (intake manifold injection), for example. Further, the liquid fuel injection may be provided in various ratios to the fresh air and to the gaseous fuel injection, depending on operating conditions.

Another example approach to at least partially address the above paradox is a method of controlling an engine having a cylinder, the method comprising: for a first combustion event, injecting gaseous fuel without injecting liquid fuel to the cylinder and delivering a first spark retard amount to combust the gaseous fuel; and for a subsequent combustion event, injecting gaseous fuel and injecting liquid fuel to the cylinder and delivering a second spark retard amount to combust the gaseous and liquid fuel, the second spark retard amount greater than the first spark retard amount. In this way, the first event, which may be an initial combustion event from rest where the cylinder did not have combustion on previous cycles, can reliably achieve combustion with low engine out emissions, but then one or more subsequent combustion events, such as after several combustion events with gaseous fuel, can utilize increased spark retard to more rapidly increase catalyst temperature. In particular, the already spinning engine during the subsequent combustion event(s) further improves the ability to achieve reliable combustion with the rich cloud, where the second spark timing is significantly more retarded than would otherwise be possible. Further, in one example, by starting the engine with gaseous fuel, and particularly without over-fueling the first combustion event (e.g., combusting at or lean of stoichiometry), it is still possible to achieve reliable combustion with reduced emissions. Namely, the over-fueling can be reduced due to the avoidance of fuel vaporization issues, such as for the first combustion event from rest.

BRIEF DESCRIPTION OF THE DRAWINGS

FIG. 7 shows an example wherein turbocharger boosting is initiated by a driver tip-in.

DETAILED DESCRIPTION

Figure 1:
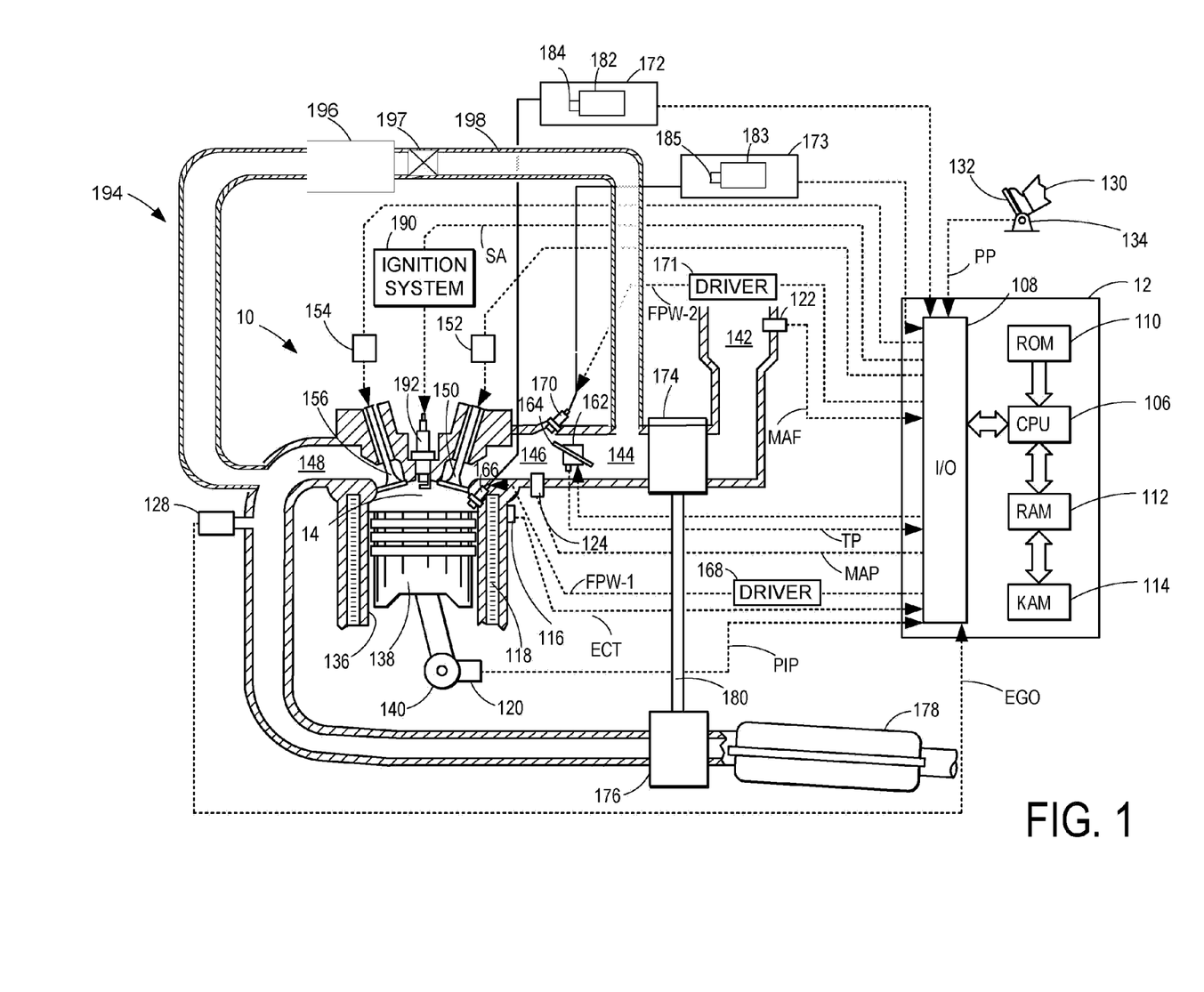
FIG. 1 depicts an example embodiment of one cylinder of an internal combustion engine.

A vehicle engine system is described in FIG. 1 that may operate with gaseous fuel and liquid fuel, injected separately and/or concurrently into the combustion chamber. In one example, the gaseous fuel may include CNG, and the liquid fuel may include directly injected (DI) gasoline. During engine starting, well-mixed gaseous fuel injection may be used with liquid fuel injection forming a rich cloud near the spark plug to enable increased spark timing retard, as illustrated in the example diagram of FIG. 2. An example method of controlling the fuel injections and other operating parameters of the engine is describe in FIG. 3, where amounts and timings of the liquid and/or gaseous injections are adjusted in coordination to one another to achieve reliable combustion during engine starting with reduced engine out emissions and faster catalyst light-off. Additionally, catalyst over-temperature protection may be addressed via coordination of both liquid and gaseous fuel injection as described in FIG. 4. Coordinated control of liquid and gaseous fuel injection may also be used to more rapidly control engine torque, such as to address turbocharger lag, as described in the routines of FIGS. 5-6, and as illustrated in the diagram of FIG. 7.

Turning now to the figures, FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Engine 10 may include an exhaust gas recirculation (EGR) system indicated generally at 194. EGR system 194 may include an EGR cooler 196 disposed along the EGR conduit 198. Further, the EGR system may include an EGR valve 197 disposed along EGR conduit 198 to regulate the amount of exhaust gas recirculated to the intake manifold 144.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing timing and/or lift amount of the respective intake and exhaust valves. The position of intake valve 150 and exhaust valve 156 may be determined by respective valve position sensors (not shown). The valve actuators may include electric valve actuation or cam actuation, or a combination thereof. In the example of cam actuation, each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to a spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Fuel may be delivered to fuel injector 166 from first fuel system 172, which may be a liquid (e.g., gasoline, ethanol, or combinations thereof) fuel system, including a fuel tank, fuel pumps, and a fuel rail. In one example as shown in FIG. 1, fuel system 172 may include a fuel tank 182 and a fuel sensor 184, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by a second fuel system 173, which may be a high pressure fuel system, including a fuel tank, a fuel pump, and a fuel rail. In one example as shown in FIG. 1, the fuel system 173 may include a pressurized gas fuel tank 183, and a fuel pressure sensor 185 to detect the fuel pressure in the fuel tank 183. Note that a single driver 168 or 171 may be used for both fuel injection systems, or multiple drivers, for example driver 168 for fuel injector 166 and driver 171 for fuel injector 170, may be used, as depicted. The fuel system 173 may be a gaseous fuel system. For example, the gaseous fuels may include CNG, hydrogen, LPG, LNG, etc. or combinations thereof.

The delivery of the different fuels may be referred to as a fuel type, such that the fuel type may be varied by injection relatively more or less of the liquid fuel compared with the gaseous fuel, or vice versa.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 124; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft.

As described above, FIG. 1 shows only one cylinder of a multi-cylinder engine. As such, each cylinder may similarly include its own set of intake/exhaust valves, fuel injector(s), spark plug, etc.

Figure 2:
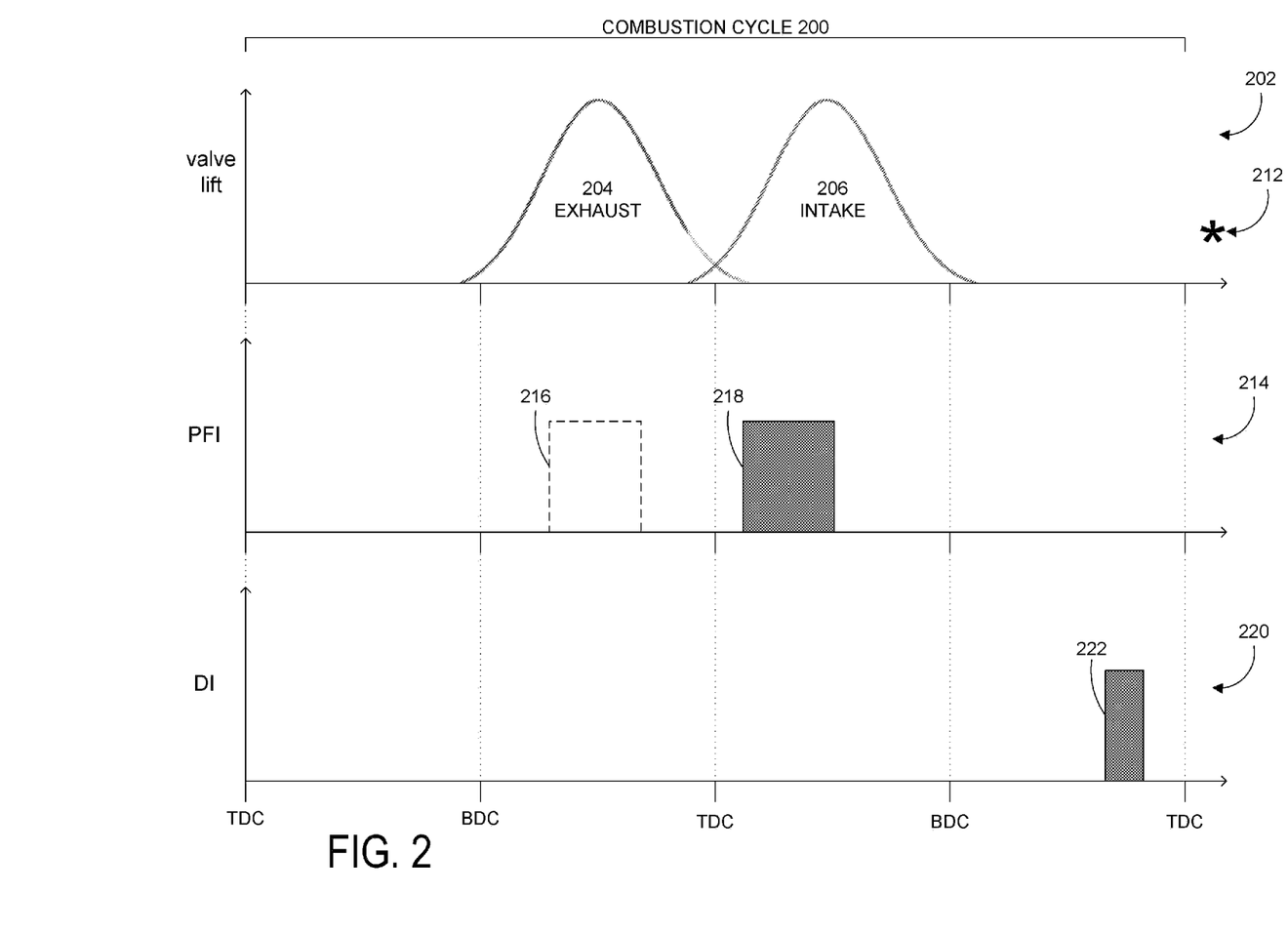
FIG. 2 shows schematic graphs of PFI and DI injection pulses during a combustion event.

Turning now to FIG. 2, schematic graphs for port fuel injector and direct injector injection pulses of an example combustion event of an engine combustion cycle 200 are shown. In one example, the combustion event during cycle 200 may be a first combustion event from rest during engine startup, such as during an engine cranking operation where the engine is rotated via a starter motor. In another example, the combustion event may be a subsequent combustion event after the first combustion event from rest, such as a second, third, fourth, or later combustion event in a cylinder from rest. In still another example, the combustion event may be a combustion event after engine RPM rises above a speed threshold, but before catalyst light-off temperature is reached.

Graph 202 shows an exhaust valve profile (204) of an exhaust valve (e.g., 156) and an intake valve profile (206) of an intake valve (e.g., 150) of combustion chamber 14 during combustion cycle 200. The x-axis of graph 202 shows crank angle, with top dead center (TDC) and bottom dead center (BDC) of piston position illustrated. A spark event may occur at 212, which is shown slightly after TDC after the compression stroke. While the graph 202 shows example valve timings, valve lifts, and spark timing, various modifications may be included, such as those described herein. For example, while graph 202 shows spark timing slightly after TDC after the compression stroke, the spark timing may be adjusted to be earlier or later, such as during an end of the compression stroke.

Graph 214 shows an example timing of a CNG port fuel injector (PFI) injection pulse 218 during cycle 200 during the intake stroke of the cylinder (e.g., injection during an open intake valve). Alternatively, the PFI injection may be before intake valve opening (e.g., injection during a closed intake valve), shown by the dashed pulse 216. While both closed and open valve injection is illustrated, various alternative timings may also be used, such as injection partially during a closed intake valve and partially during an open intake valve. In addition to variable injection timing (e.g., variable start of injection timing), variable injection amount (e.g., duration) may also be used, depending on operating conditions. Further, fuel injection amounts may be adjusted to maintain a stoichiometric air-fuel ratio in the cylinder/exhaust.

During engine operation, the port fuel injection of gaseous fuel (e.g., CNG) during or before the intake stroke mixes with fresh air flowing into the combustion chamber, thus enabling the gaseous fuel and fresh air to form a well-mixed mixture.

Graph 220 shows an example timing of a direct injector (DI) pulse 222 in combustion cycle 200. The DI injects liquid fuel (e.g., gasoline, ethanol, or combinations thereof) into combustion chamber 14. The timing of the DI liquid fuel pulse 222 may be adjusted based on engine speed, engine temperature (e.g., measured by an ECT sensor), and/or other engine operating conditions. Specifically, during engine operation, the timing of the DI injection is set so that the fuel forms a rich pocket near the spark plug at a desired timing for ignition. As the desired spark timing is retarded, the DI fuel injection may be correspondingly retarded so that the formation of the rich pocket near the spark plug is aligned with the timing of the spark.

Additional details regarding control for the various injections and timings are described with regard to FIGS. 3-7.

Figure 3:
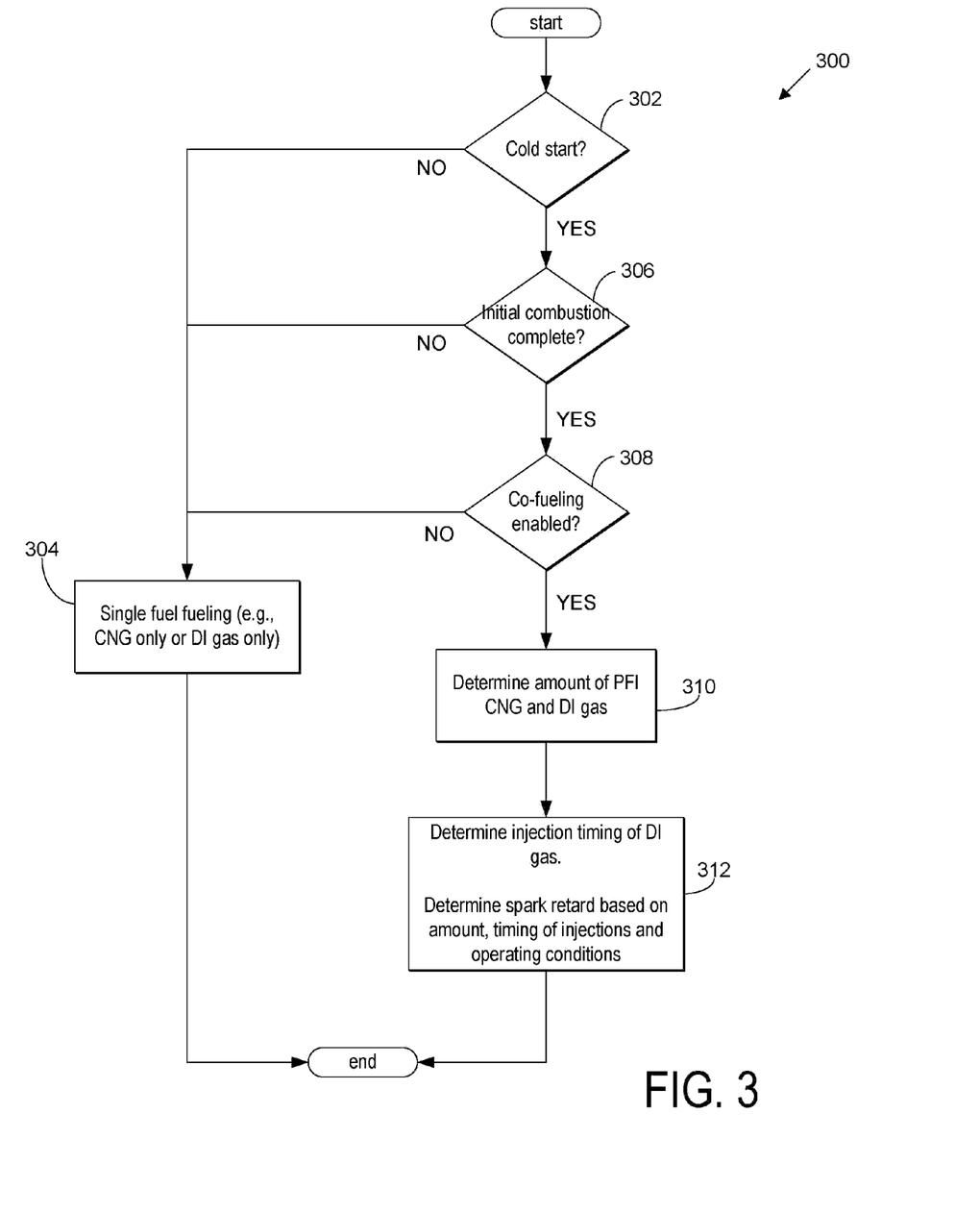
FIGS. 3-6 show methods of co-fueling system control under a variety of engine conditions.

FIG. 3 shows an example control routine 300 for the initiation of co-fueling of port injected gaseous fuel (e.g. CNG) and directly injected liquid fuel (e.g., gasoline, gasoline-ethanol blend, etc.) to a cylinder of the engine 10 during engine start.

First, at 302, the routine determines whether engine cold starting conditions (e.g., engine starting from non-warmed up conditions) are present. Such conditions may be identified based on an engine shut-down duration, comparison of engine coolant temperature with ambient temperature, and/or various other parameters. When the answer to 302 is no, the routine continues to 304. During 304, the engine operates with a single injection of fuel during the engine start (e.g., gaseous fuel injection). For example, during warmed-up engine starts, engine re-starts, etc., a single injection of fuel may be used.

When the engine is started under cold start conditions at 302, the routine continues to 306. At 306, the routine determines whether an initial combustion from rest (e.g., the first combustion event from rest of the engine start) has been completed. For example, the initial combustion may allow for the engine speed to surpass a threshold amount, e.g., engine RPM>600. If so, the routine continues to 308. If not, even during cold engine starting, the first combustion event may be fueled according to 304. Thus, in one example, the operation of 304 may be carried out during a cold engine starting during the initial combustion event from rest, until the engine completes initial combustion and/or until the engine RPM is larger than a given threshold value.

Continuing with FIG. 3, at 308 the routine determines whether co-fueling is enabled. Various operating conditions may be monitored to define a region in which co-fueling is enabled, such as ambient temperature being within a selected range, ambient pressure being within a selected range, etc. If the answer to 308 is no, the routine again continues to 304. Otherwise, the routine continues to 310 to determine the amount of port injected gaseous fuel (e.g., CNG) and the amount of direct injected liquid fuel (e.g., ethanol, gasoline, or mixtures thereof) based on engine operating conditions (e.g., RPM, catalytic converter temperature, spark retard, etc.).

Next, the injection timing of the directly injected liquid fuel and the spark retard is determined at 312 based on the amount and timing of fuel injections and engine operating conditions. The amount and timing of liquid fuel injection may be dependent on the amount of spark retard. In one example, the amount of retard of the spark timing may be increased with an increase in the amount of liquid fuel injection. The increase in amount of liquid fuel injected improves the ability to achieve reliable combustion with the rich cloud, allowing for spark timing to be significantly more retarded than would otherwise be possible. In another example, if spark retard is increased, the amount of directly injected liquid fuel may be increased to maintain the rich cloud to achieve reliable combustion. Alternatively, the timing of the direct injection may be retarded in correspondence with the spark retard.

Further, depending on the combustion event (e.g., during a second or subsequent combustion event from rest) the port injected gaseous fuel may be injected to the cylinder at least during or before an intake stroke of an engine cycle to form a well-mixed overall lean air-fuel mixture, and the direct injected liquid fuel may be injected to the cylinder at least during one of a compression and expansion stroke of the engine cycle to form a rich air-fuel cloud near the spark plug; and spark igniting the injected fuels. Thus, when co-fueling is carried out during the start, additional spark retard may be provided, as compared with the single fuel fueling of 304.

In one example, such as during a subsequent combustion event from the start or after engine speed has maintained a threshold speed (e.g., 600 RPM), a majority of the total fuel burned may be gaseous fuel, and further the spark timing may be additionally retarded via the rich cloud while stilling maintaining sufficient combustion stability. In this way, it is possible to achieve both low engine out emissions as the majority of burned fuel is gaseous and well mixed (and lean of stoichiometry), but is it also possible to further retard spark timing and achieve reliable combustion via the rich cloud formed by the liquid fuel injection when co-fueling is enabled.

In the example where co-fueling is enabled after engine speed reaches a threshold speed, the initial combustion event(s) may allow for the already spinning engine during the later combustion events to further improve the ability to achieve reliable combustion with the rich cloud and with spark timing significantly more retarded than would otherwise be possible.

As an example, during the first combustion event of a start from rest, gaseous fuel may be injected (304) without injecting liquid fuel to the cylinder. A first spark retard amount may be delivered to combust the gaseous fuel. Then, if co-fueling is enabled for a subsequent combustion event (such as after a plurality of combustion events without gaseous fuel, or immediately following the first combustion event), port injected gaseous fuel and direct injected liquid fuel may be provided. The subsequent combustion event may occur in a second cylinder following, according to a cylinder firing order, the cylinder having the first combustion event. Alternatively, it may be a subsequent (e.g., second, third, etc.) combustion event in the cylinder having the first combustion event.

Continuing with the subsequent combustion event operation, both gaseous fuel and liquid fuel may be injected to the cylinder and a second spark retard amount, which may be different from and more retarded than the first spark retard amount, is used to combust the gaseous and liquid fuel during the subsequent combustion event. Further, the amount of gaseous fuel injected during the subsequent combustion event may be less than the amount injected during the prior combustion event.

In this way, the prior event (without gaseous fuel) can reliably achieve combustion with low engine out emissions, but then later combustion events can utilize increased spark retard to more rapidly increase catalyst temperature, while achieving low engine out emissions. For example, injecting well mixed gaseous fuel (e.g., CNG) can lead to more complete combustion as compared to liquid fuel, yet some liquid fuel injection to improve combustion stability with increased spark retard can increase exhaust temperature at a faster rate leading to faster catalyst light-off. Further, for still later combustion events, only liquid fuel, such as gasoline, may be used since gasoline may have a lower catalyst light-off temperature than a gaseous fuel such as CNG. In this example, before reaching catalyst light-off, gaseous and liquid fuel injections are used (along with further retarded spark timing, for example), and then once the catalyst nears the liquid fuel light-off temperature, the combustion can be transitioned to a majority (e.g., all) liquid fuel injection.

Figure 4:
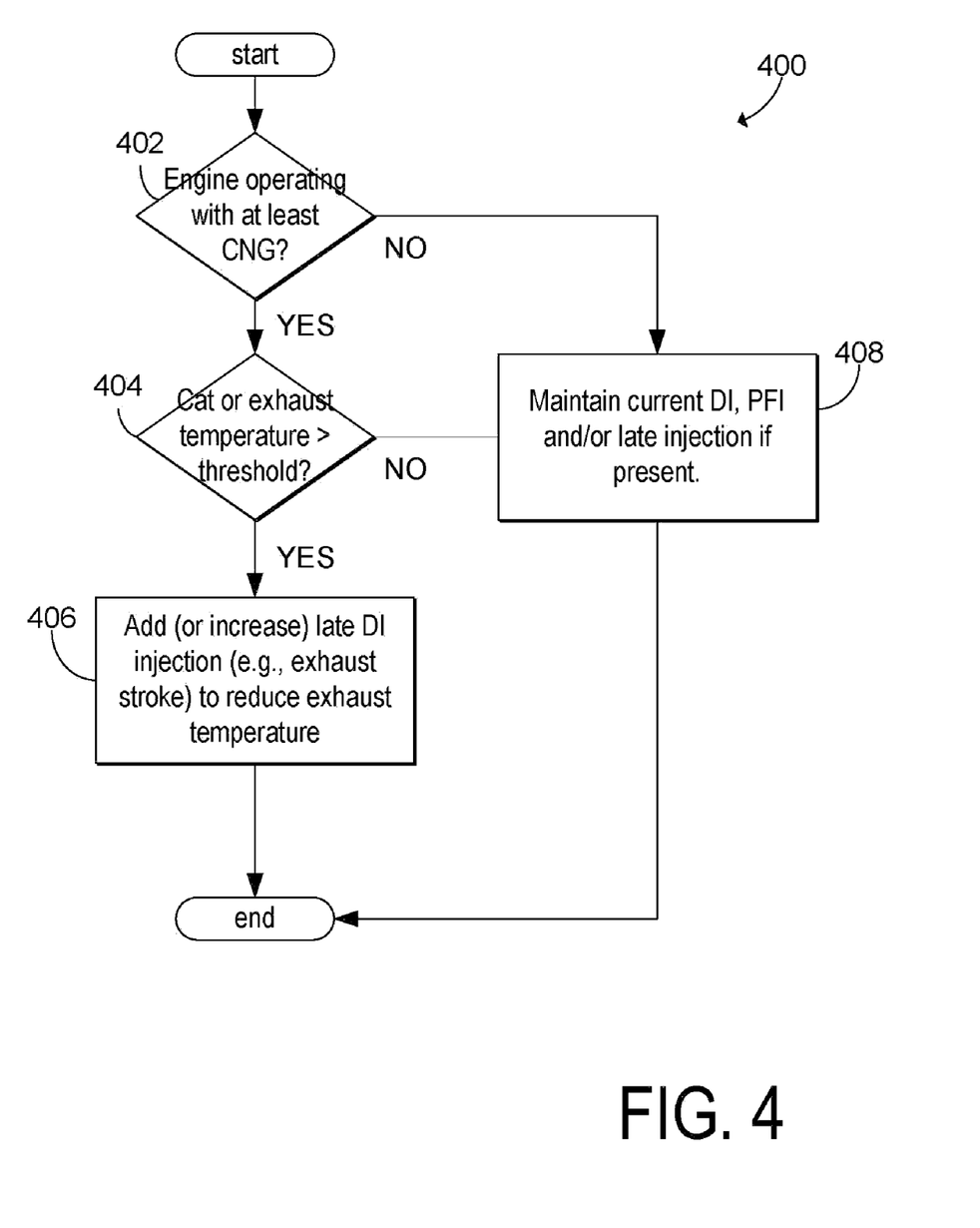

FIG. 4 shows an example control routine 400 for reducing exhaust temperature when the engine is operating with at least CNG at 402. In this example, if the temperature of the catalytic converter and/or the exhaust gas is above a preset temperature threshold (which in one example is a durability-related maximum operating temperature of the catalytic converter) at 404, late DI injection (e.g., during the exhaust stroke) is increased at 406 to reduce exhaust temperature. Vaporization of the liquid fuel is endothermic, drawing heat to vaporize thus reducing exhaust temperature. For example, during warmed up conditions, if the engine is turbocharged and running with spark at a peak torque timing (e.g., MBT) for port injected CNG, the engine exhaust temperature may be cooled by increasing liquid fuel injection. In one example the amount of liquid fuel injection may be increased while continuing injection of gaseous fuel and without retarding spark timing in response to exhaust temperature rising to an upper temperature threshold. Alternatively, if the engine is not operating with CNG at 402 or if the temperature of the catalytic converter and/or exhaust gas is below a preset threshold, then the current direct injection, port fuel injection, and/or late direct injection (if present) amounts are maintained.

Figure 5:
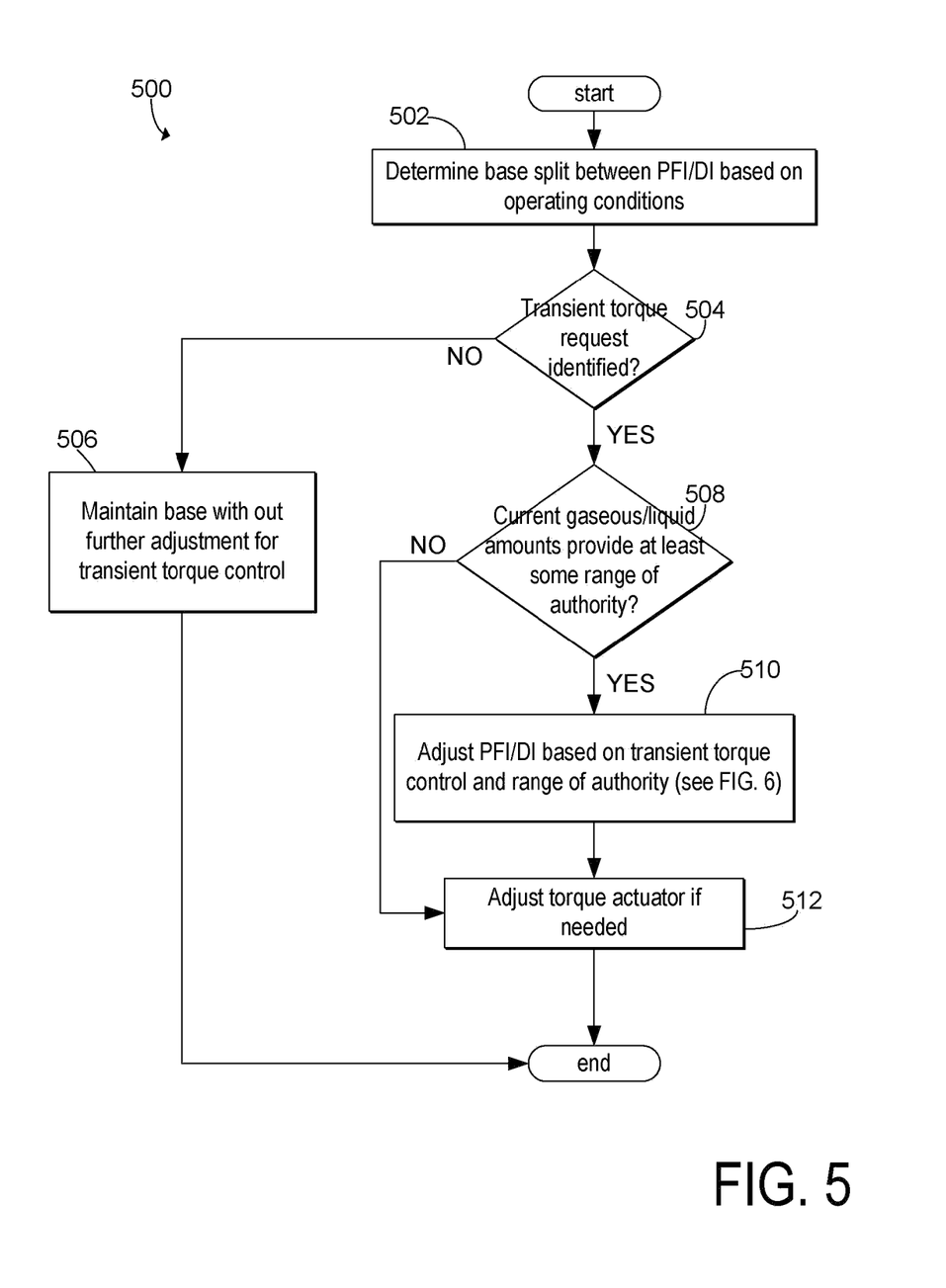
Figure 6:
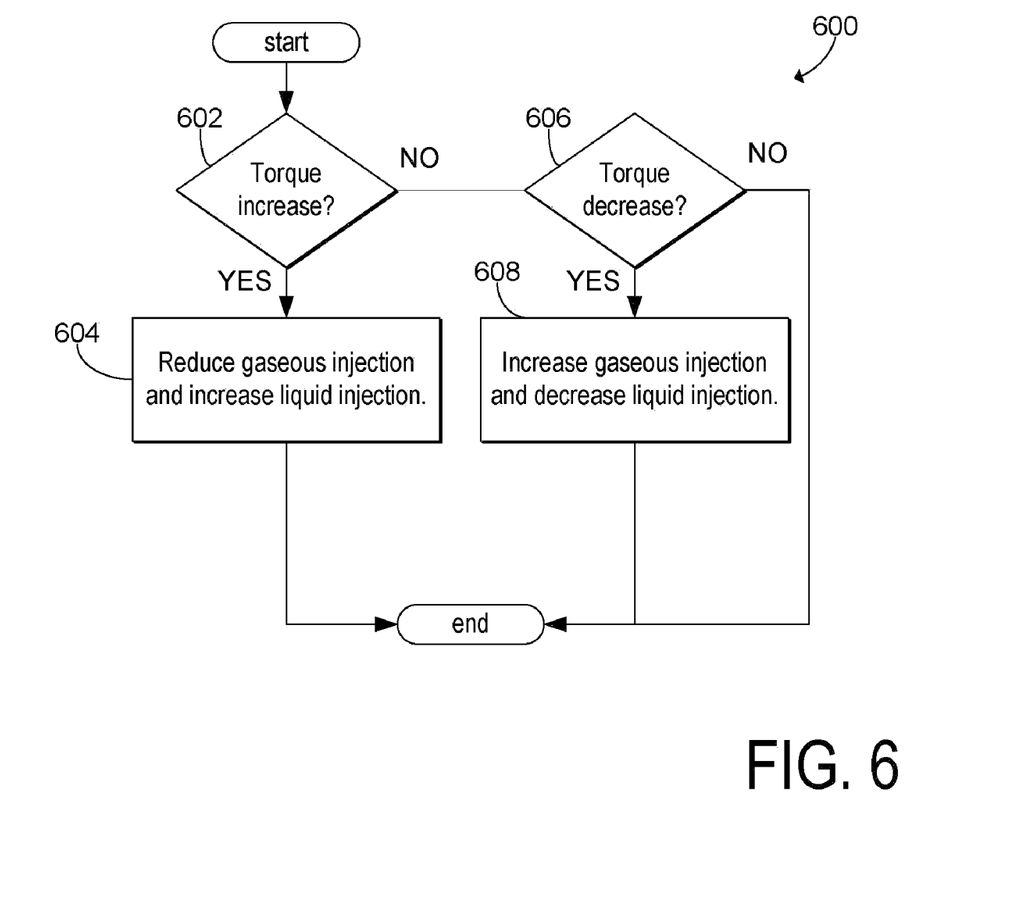
Figure 7:
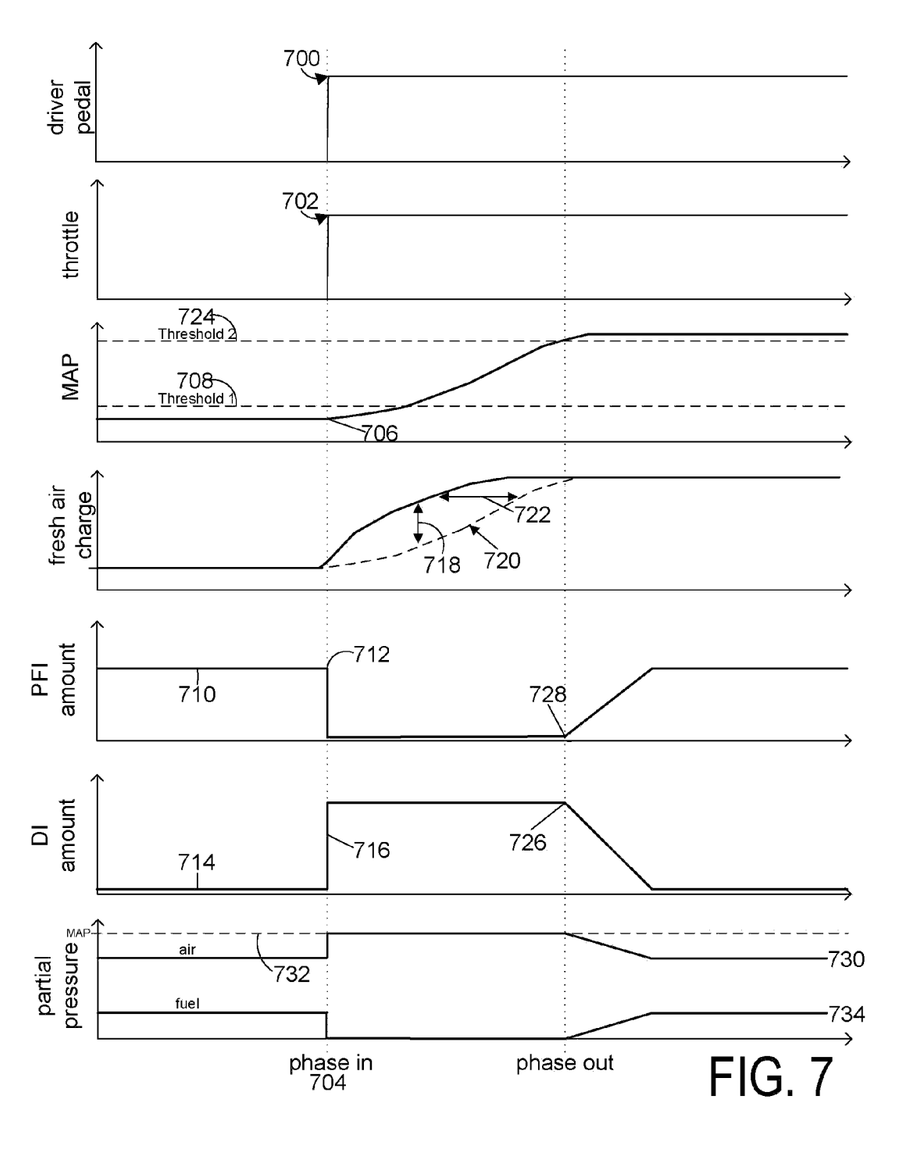

Referring now to FIGS. 5-7, various operations are described that advantageously manipulate the displacement of fresh air by gaseous fuel injection. Specifically, FIGS. 5-7 describe adjustment of liquid and gaseous fuel injection to a cylinder of the engine for rapid transient torque control.

When an engine is being operated at boost or incipient boost, a "fast acting" torque reserve may be used while a "slower-acting" torque comes on (boost in this case). In some operating conditions or configurations torque reserve is provided via maintaining excess boost in combination with throttling. While such an approach may provide acceptable results under some conditions, under other conditions maintenance of such excess boost can reduce fuel efficiency. As described further below, switching temporarily to liquid fuel from gaseous fuel (or adjusting relative amounts of gaseous and liquid fuel injection to a cylinder) may be used to provide the requisite fast-acting torque reserve when the engine is not throttled (steady state efficient). Additional fast-acting torque reserve may also be available from alterations in other parameters, such as valve timing In the example of gaseous CNG, it can displace intake air by up to 13% leading to up to 13% less peak torque. However, liquid fuel displaces essentially no air. thus by decreasing gaseous fuel injection while increasing liquid fuel injection, additional fresh air can be provided even without adjusting throttling, boosting, engine speed, valve timing, and the like. Specifically, the decreasing in gaseous fuel enables increase fresh air cylinder charge to be inducted to the cylinder. Likewise, the additional liquid fuel injection (to both compensate for the decreasing gaseous fuel and to compensate for the additional fresh air) enables the increased fresh air to generate a corresponding increased engine torque (e.g., up to an additional 13% when transitioning from only CNG fuel to only liquid fuel). While adjusting of the fuel injection can thus influence torque, additional actions may also be taken in combination to further adjust torque, such as decreased throttling, increased boosting, etc. Further, in addition to increasing cylinder fresh charge by decreasing gaseous fuel injection to the cylinder (and increasing liquid fuel injection to the cylinder), it is also possible to decrease cylinder charge by increasing gaseous fuel injection to the cylinder (and decreasing liquid fuel injection to the cylinder). The adjustments can thus not only adjust cylinder charge, but also maintain cylinder and exhaust air-fuel ratios. Moreover, such adjustments in cylinder air amounts can provide rapid transient torque effects as they are less restricted by manifold filling effects.

When applying adjustments in the liquid and gaseous fuel injection to provide transient torque control, it may also be advantageous to consider a range-of-authority of the adjustment. For example, if mostly transient increases in engine torque are provided, then during steady conditions the fueling may be biased toward more gaseous fuel injection (so that there is gaseous fuel which can be reduced). Thus, in one example, routines, such as in FIG. 5, may be provided for balancing the relative amounts of liquid and gaseous fuel during conditions where transient torque increases may be advantageously applied (e.g., low speed, low boost levels).

Referring now to FIG. 5, it shows a sample routine 500 for adjusting transient torque by adjusting the port injected gaseous fuel and directly injected liquid fuel injection amounts. In this example, the base split between port injected gaseous fuel and directly injected liquid fuel injection is determined at 502 based on engine operating conditions (e.g., torque requirements, engine RPM, catalytic converter temperature, spark retard). The base split represents the steady state desired relative amounts of liquid and gaseous fuel injection for a given operating condition. As noted above, during low speed, low load conditions, this may be a relatively high amount of gaseous fuel (e.g., 80%), whereas during high speed and/or high load conditions, this may be a relatively lower amount of gaseous fuel (e.g., 50%), on a molar basis.

If a transient torque request is not identified at 504, the base levels are maintained without further adjustment at 506. However, if a transient request is identified at 504 and the current gaseous/liquid amounts provide at least some range of authority at 508, then the port injected gaseous fuel and directly injected liquid fuel injection amounts are adjusted based on transient torque and range of authority at 510, as further elaborated in FIG. 6. The adjustments made to the gaseous and liquid fuel amounts are such that a stoichiometric air-fuel ratio is maintained; for example a gaseous fuel injection amount is adjusted to adjust displacement of fresh air to the cylinder and a liquid fuel injection amount is adjusted to match the adjusted fresh air in the cylinder. The torque actuator (e.g., throttle) may further be adjusted at 512 if needed in order to maintain a stoichiometric air-fuel ratio, and/or further adjust cylinder charge/engine torque.

One particular example of a transient torque request includes, during idling operation and/or low vehicle speed and low engine speed conditions (where turbocharger speed is relatively low) and/or when a boost level is less than a threshold amount. For example, the torque of the cylinder may be adjusted in response to a difference between a desired engine idle speed and actual engine idle speed during idle speed control. In these conditions, the base split may be set to substantially all gaseous fuel injection. Then, in response to driver demand (e.g., a driver tip-in) and the corresponding increase in desired engine torque, the gaseous fuel injection may be substantially reduced and liquid fuel injection increased (to not only compensate for the reduced gaseous fuel, but also to compensate for the increased fresh charge). Such operation can fill in engine torque while the turbocharger is speeding up in response to the driver tip-in. In this way, a faster vehicle response can be achieved providing improved customer satisfaction.

FIG. 6 shows a sample routine 600 for increasing or decreasing engine torque by adjusting the amounts of gaseous and liquid injections based on a transient torque request at 504. If an increase in torque is requested at 602, for example in response to boost level or driver demand, the gaseous injection amount is reduced and the liquid injection amount is increased at 604. If a decrease in torque is needed at 606, for example in response to an over-speed condition during idle speed control, the liquid injection amount is reduced and the gaseous injection amount is increased at 608.

In one example, an engine running on at least port injected gaseous fuel (e.g., CNG) and operating with a turbocharger at lower engine speed and with reduced boosting conditions can show an improved response to a driver tip-in. For example, if the engine is running on CNG only, then approximately 13% of the cylinder fresh air charge is displaced by the gaseous fuel. In this example cylinder fresh air charge may then be increased by increasing liquid fuel injection amount while decreasing gaseous fuel injection amount to maintain a stoichiometric air-fuel ratio. Increasing liquid fuel injection to the cylinder while decreasing (e.g., stopping) gaseous fuel injection to the cylinder may thereby increase cylinder air charge and thus torque of the engine. Specifically, the liquid fuel injection increase not only supplements the decrease of gaseous fuel, but further includes additional fuel to match the decreased gaseous injection. The increase in cylinder fresh charge and thus cylinder torque can "fill-in" the turbo-lag normally experienced while waiting for the turbocharger to spin-up in response to the tip-in.

Note that various other adjustments may be further included in the routines of FIGS. 5-6, such as adjustment of EGR system 194 via an EGR valve 197 during the transient operation described herein. For example, the recirculation of exhaust gas may be reduced during conditions where tip-in turbo lag may be present, thus enlarging the range of authority for fresh air charge adjustment via adjustment of gaseous injection, as the EGR also displaces fresh air and can dilute the range of torque authority.

As another example, consideration of knock may also be included in adjusting the relative amount of gaseous and liquid fuel injection to a cylinder of the engine, as some gaseous fuel injection may have higher knock abatement than some liquid fuel injection. For example, in the example situation of a tip-in during idle, it can be advantageous to decrease gaseous fuel injection as noted above. However, such operation may increase a potential for engine knock. Thus, during conditions where engine knock is more likely (e.g., increased ambient temperature and decreased ambient humidity), the amount of transient torque increase employed in FIG. 6, e.g., during tip-in turbocharger spin-up conditions, may be reduced as compared to conditions where engine knock is less likely (e.g., decreased ambient temperature and increased ambient humidity). Further, modifications to the transient torque adjustment of gaseous and liquid fuel injection may be employed based on feedback from engine knock, where although a torque request would call for decreased gaseous fuel injection, such a request may be overridden when engine knock has been detected. Otherwise, the predominately liquid fuel injection may be allowed but with spark retard from MBT to account for the knock resistant fuel. This tends to increase exhaust gas energy which may be beneficial to turbocharger turbine spin-up. The spark retard partially offsets the torque increase from the reduction in fuel displacing air.

Referring now to FIG. 7, an example is shown illustrating in further detail example operation of FIGS. 5-6 in the example of a tip-in from reduced boosting conditions. The graphs illustrate the increased engine torque response that can be transiently achieved and thereby mask turbocharger lag.

In this example a driver tip-in occurs at 700 which may lead to an opening of the throttle at 702 at a phase-in point 704. The opening of the throttle at 702 increases intake air delivered to the cylinder. Since the manifold air pressure 706 at phase-in point 704 is lower than a first threshold amount 708, the port fuel injector, which is injecting gaseous fuel (e.g., CNG) at 710, is decreased at 712 in response to driver tip-in 700. The direct injector, which may be injecting liquid fuel at 714 in an amount such that the stoichiometric cylinder air fuel ratio is maintained, is increased at point 716 in order to maintain the stoichiometric cylinder air fuel ratio when the port injected gaseous fuel is increased at point 712. The decrease in the amount of port injected gaseous fuel leads to an increase in the partial pressure of air as shown in curve 730. When switching from gaseous to liquid fuel, for example at phase point 704, the partial pressure of air goes near the MAP (shown by dashed line 732) and the partial pressure of the injected fuel, shown by curve 734, goes to near zero. In one example, where the port injected gaseous fuel is CNG, the decrease of CNG at 712 may lead to more fresh air charge as shown at 718 and as compared with what the airflow would otherwise be (without gaseous fuel adjustment 720). The additional fresh charge at 718 may lead to a reduction of the effects of turbocharger lag 722. In this example, once the turbocharger has been "spun up" the fuel injection may be switched back to CNG, although at a slower rate of change than the phase-in.

In the example of FIG. 7, when the manifold air pressure reaches a second threshold 724 the port injected gaseous fuel injection is gradually increased at 728 (the phase-out point). The directly injected liquid fuel injection is correspondingly decreased at 726 in order to maintain the stoichiometric cylinder air-fuel ratio. At the phase out points 724 and 726, the increase and decrease in port injected gaseous fuel and directly injected liquid fuel injection amounts, respectively, are ramped out to maintain the desired range of authority. In this scenario, the increased liquid fuel injection provides more additional liquid fuel than the equivalent decrease of gaseous fuel to account for the increased cylinder fresh air that is no longer displaced by the gaseous fuel.

Note that the various routines included herein may be used all together, or individually, if desired and may be used with various engine and/or vehicle system configurations. For example port injected gaseous fuel used during an engine cold start without liquid fuel injection, yet using coordination of gaseous and liquid fuels to control engine torque and/or address turbocharger lag falls within the scope of this invention. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having at least a first and second cylinder;
each of the first and second cylinders having a liquid fuel injector and a gaseous fuel injector coupled thereto;
a turbocharger coupled to the engine; and
a control system coupled to the engine, the control system having a computer storage medium with instructions encoded thereon, the instructions comprising:
instructions to, during a first combustion event from rest of engine starting, inject gaseous fuel to the first cylinder from the gaseous fuel injector at least during or before an intake stroke of an engine cycle of the first cylinder to form a well-mixed overall lean air-fuel mixture;
instructions to initiate spark combustion spark combustion of at least the injected gaseous fuel in the first cylinder; and
instructions to, during a second combustion event immediately following the first combustion event in a firing order of the engine, inject gaseous fuel to the second cylinder from the gaseous fuel injector at least during or before an intake stroke of an engine cycle of the second cylinder to form a well-mixed overall lean air-fuel mixture and to directly inject liquid fuel from the liquid fuel injector to the second cylinder at least during one of a compression and expansion stroke of the engine cycle of the second cylinder to at least form a rich air-fuel cloud near the spark plug; and
instruction to initiate spark combustion of the injected fuels in the second cylinder.

2. A method of controlling an engine having a cylinder with a spark plug, the method comprising:
during engine starting, injecting gaseous fuel to the cylinder at least during or before an intake stroke of an engine cycle to form a well-mixed overall lean air-fuel mixture, and then directly injecting liquid fuel to the cylinder at least during one of a compression and expansion stroke of the engine cycle to form a rich air-fuel cloud near the spark plug; and
initiating combustion of the injected fuels via spark ignition.

3. The method of claim 2 wherein an amount of gaseous fuel injection is greater than an amount of liquid fuel injection, and wherein an overall air-fuel ratio of fresh air to liquid and gaseous fuel is lean of stoichiometry.

4. The method of claim 2 further comprising adjusting a timing of the liquid fuel injection based on engine speed and engine coolant temperature, and wherein the liquid fuel is mixed to a lesser degree with fresh air than the gaseous fuel.

5. The method of claim 2 wherein the spark is at a second spark timing, and where the injecting of gaseous and liquid fuels to the cylinder is during a second combustion event in the cylinder from initial engine rotation of the engine from rest, the method further comprising, during a first combustion event of the cylinder preceding the second combustion event, the first combustion event being a first combustion event in the cylinder from initial engine rotation of the engine from rest, injecting gaseous fuel to the cylinder without injecting liquid fuel to the cylinder.

6. The method of claim 5 wherein the first combustion event immediately precedes the second combustion event in the cylinder.

7. The method of claim 5 wherein the second combustion event is carried out when engine speed is greater than a threshold amount.

8. The method of claim 2 wherein a spark timing of the spark ignition is retarded from a peak torque timing.

9. The method of claim 8 wherein an amount of retard of the spark timing is increased with an increased amount of the liquid fuel injection.

10. A method of controlling an engine having a cylinder, the method comprising:
for a first combustion event, injecting gaseous fuel without injecting liquid fuel to the cylinder and delivering a first spark retard amount to initiate combustion of the gaseous fuel; and
for a subsequent combustion event, injecting gaseous fuel and injecting liquid fuel to the cylinder and delivering a second spark retard amount to initiate combustion of the gaseous and liquid fuel, the second spark retard amount greater than the first spark retard amount.

11. The method of claim 10 wherein the first and subsequent combustion events are during an engine start.

12. The method of claim 11 wherein the first combustion event is the first combustion event from rest, and where the subsequent combustion event is before reaching a catalyst light-off temperature; the method further comprising: for a third combustion event after the subsequent combustion event, injecting liquid fuel without injecting gaseous fuel upon reaching the catalyst light-off temperature.

13. The method of claim 11 wherein the first combustion event is the first combustion event from rest, and where the subsequent combustion event is after a plurality of combustion events following the first combustion event.

14. The method of claim 13 wherein the subsequent combustion event is after the first combustion event and after engine speed rises above a speed threshold.

15. The method of claim 11 wherein the subsequent combustion event immediately follows the first combustion event in an engine firing order of the engine, the engine having a plurality of cylinders.

16. The method of claim 15 wherein an amount of gaseous fuel injected in the subsequent combustion event is less than an amount of gaseous fuel injected in the first combustion event.

17. The method of claim 15 further comprising adjusting an amount of liquid fuel injection for the subsequent combustion event, where the amount increases with an increasing second spark retard amount.

18. The method of claim 17 further comprising, boosting intake air of the engine, and during warmed-up conditions, increasing an amount of liquid fuel injection while continuing injection of gaseous fuel and without retarding spark timing in response to exhaust temperature rising to an upper temperature threshold.

19. The method of claim 15 further comprising adjusting timing of the liquid injection to be different for the first combustion event as compared to for the subsequent combustion event based on one or more of engine speed and engine coolant temperature.

20. The method of claim 19 wherein timing of the liquid fuel injection for the subsequent combustion event is retarded as spark timing is retarded.

21. The method of claim 20 wherein an amount of retard of the liquid fuel injection for the subsequent combustion event is based on an amount of liquid injection for the subsequent combustion event.

* * * * *